United States Patent
Schramm et al.

(10) Patent No.: US 9,091,346 B2
(45) Date of Patent: Jul. 28, 2015

(54) METHOD FOR ROUGHENING AND COATING A SURFACE

(75) Inventors: Leander Schramm, Remda-Teichel (DE); Clemens Maria Verpoort, Monheim (DE); Enrico Hauser, Langenbach (DE); Alexander Schwenk, Wohlen (CH)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 13/823,130

(22) PCT Filed: Dec. 1, 2011

(86) PCT No.: PCT/EP2011/071469
§ 371 (c)(1),
(2), (4) Date: Mar. 14, 2013

(87) PCT Pub. No.: WO2012/095215
PCT Pub. Date: Jul. 19, 2012

(65) Prior Publication Data
US 2013/0284140 A1    Oct. 31, 2013

(30) Foreign Application Priority Data
Jan. 12, 2011    (DE) .......................... 10 2011 002 597

(51) Int. Cl.
*F02F 1/00*    (2006.01)
*F16J 10/04*    (2006.01)
*C23C 4/02*    (2006.01)

(52) U.S. Cl.
CPC . *F16J 10/04* (2013.01); *C23C 4/02* (2013.01); *Y10T 428/13* (2015.01); *Y10T 428/31* (2015.01)

(58) Field of Classification Search
USPC .................... 123/193.2, 668–669; 29/888.06, 29/888.061
See application file for complete search history.

(56) References Cited

U.S. PATENT DOCUMENTS

| 6,622,685 B2 * | 9/2003 | Takahashi et al. .......... 123/193.2 |
| 7,104,240 B1 * | 9/2006 | Vuk et al. ................... 123/193.2 |
| 2007/0012180 A1 * | 1/2007 | Miyamoto et al. ............ 92/171.1 |
| 2008/0245227 A1 * | 10/2008 | Iizumi et al. ................. 92/169.1 |
| 2010/0101526 A1 * | 4/2010 | Schaefer et al. ........... 123/193.2 |

FOREIGN PATENT DOCUMENTS

| DE | 202009014180 U1 | 1/2010 |
| EP | 1854903 A1 | 11/2007 |
| EP | 2267178 A2 | 6/2010 |
| FR | 2924365 A1 | 6/2009 |
| WO | 0240850 A1 | 5/2002 |

* cited by examiner

*Primary Examiner* — Hung Q Nguyen
(74) *Attorney, Agent, or Firm* — Raymond Coppiellie; Price Heneveld LLP

(57) ABSTRACT

A method for roughening and thermally coating a surface, in particular a cylinder running surface of an internal combustion engine, the roughening being the preparation of the surface for the thermal coating of the surface with a coating. The method is characterized in that different roughening profiles are introduced into the surface during the roughening and the coating has different properties distributed over the surface. This allows the coating or spraying process during the later thermal coating to be carried out with substantially constant spraying parameters. The different properties of the coating, such as hardness, porosity, machinability, chemical composition, oxidation and adhesion, are then obtained just on the basis of the differently roughened surface.

19 Claims, 2 Drawing Sheets

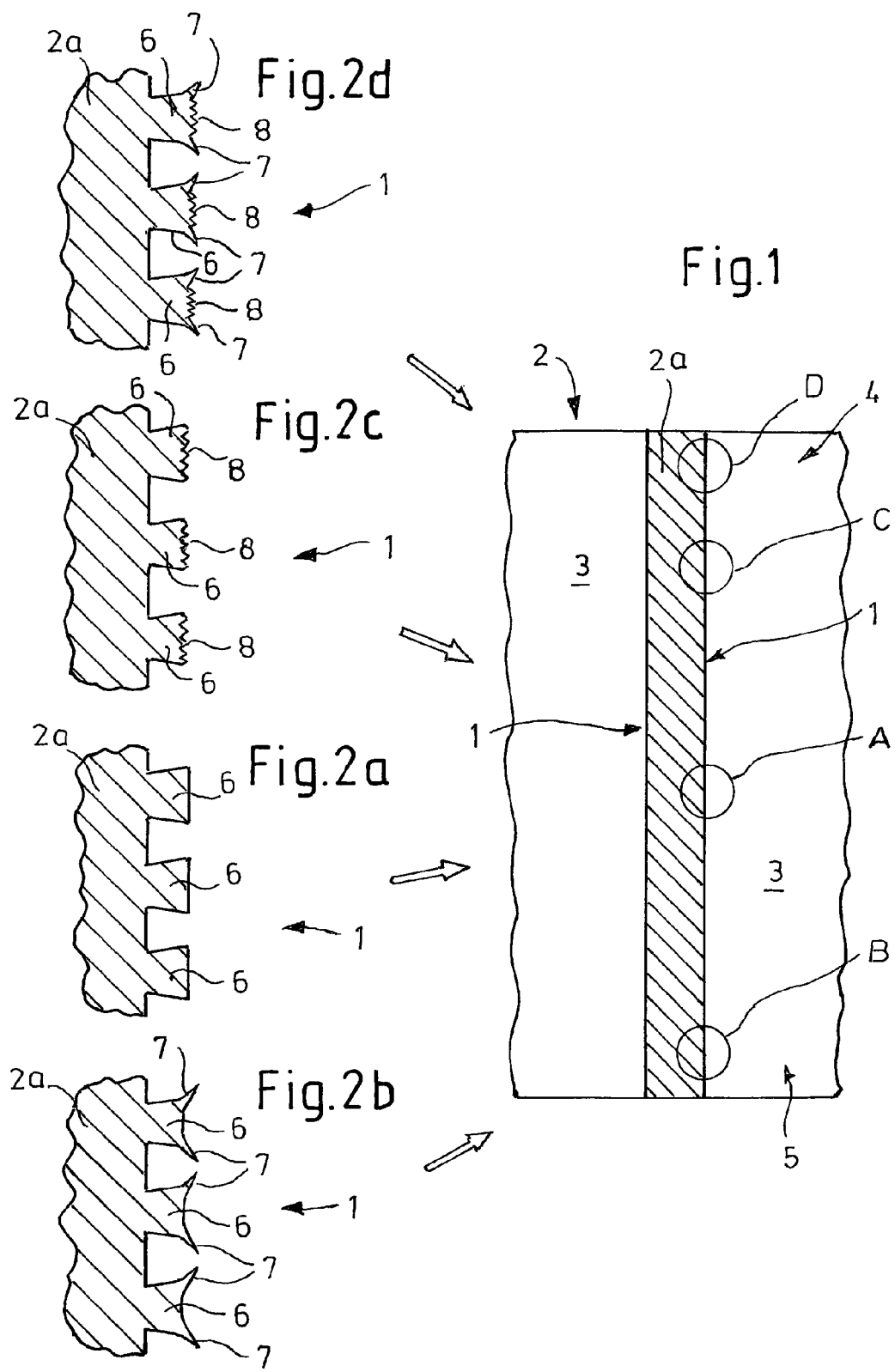

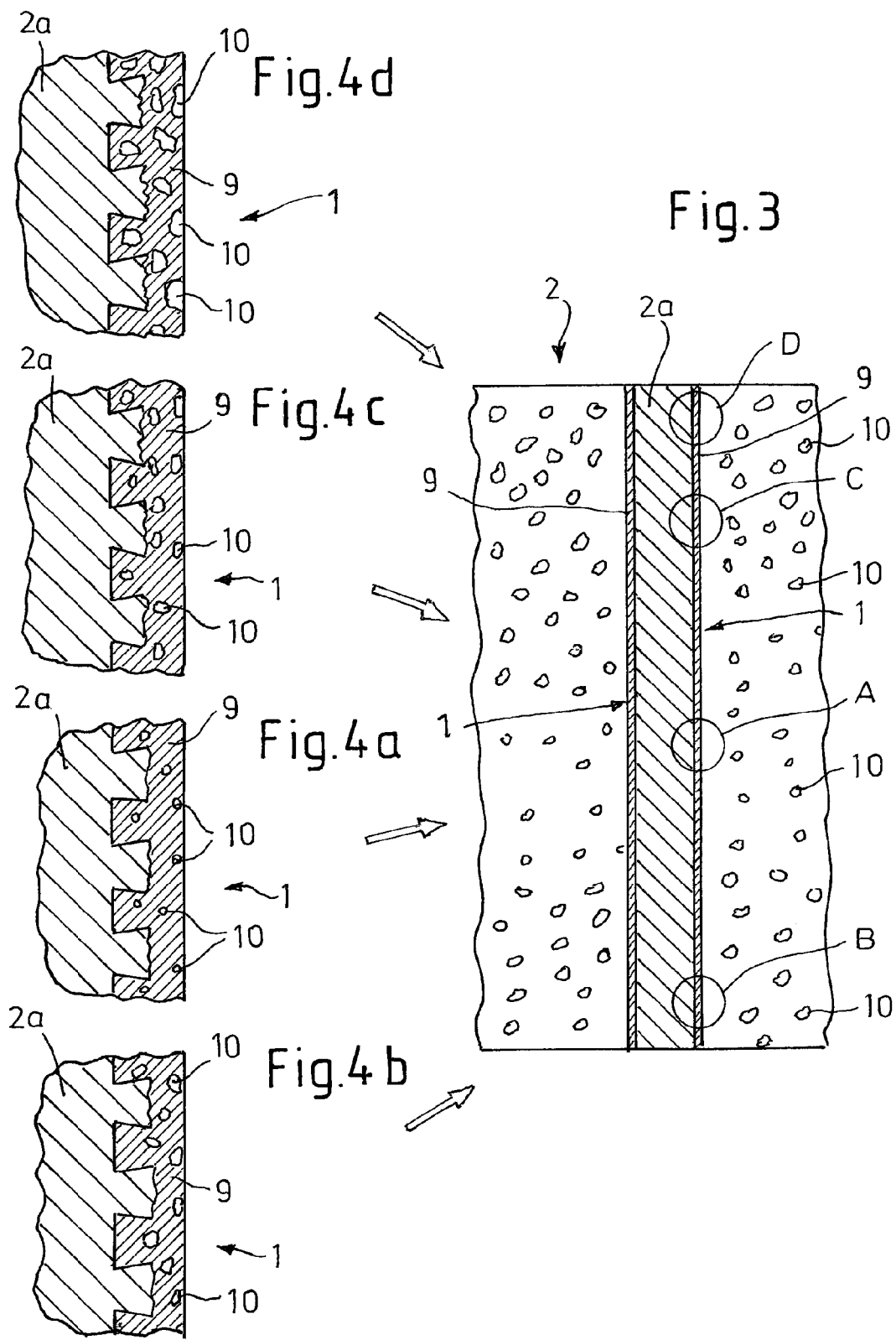

METHOD FOR ROUGHENING AND COATING A SURFACE

FIELD OF THE INVENTION

The invention relates to a method for roughening and coating a surface, in particular the cylinder running surface of an internal combustion engine, and to a workpiece produced by this method.

BACKGROUND OF THE INVENTION

In the case of cylinder running surfaces that are produced by a thermal coating process, a large part of the oil retaining volume is accounted for by the pores exposed during the honing. It is known that different porosities distributed over the cylinder running surface can improve the tribological properties during the operation of the engine. Consequently, the required oil retaining volume differs over the length of the cylinder running surface. Thus, slightly more oil retaining volume is required at the points of reversal of the piston movement than between these two points. Specifically at the upper point of reversal, influences such as for example high thermal and mechanical loading mean that there is the risk of an oil film breaking down.

FR 2924365 A1 discloses applying a coating by a thermal spraying process in such a way as to produce different porosities over the cylinder running surface, in that spraying parameters, for example the duration and/or the rate of the spraying operation, the preheating temperature or the composition of the sprayed material, are varied during the spraying. It is disadvantageous that a constant spraying process cannot be performed here, but instead the spraying parameters have to be set appropriately to correspond to the respective position of the spraying head.

SUMMARY OF THE INVENTION

The object of the invention is therefore to provide a method in which the variation of the porosity and other properties of the coating over the cylinder running surface can be achieved in a simple way, in particular without changing the spraying parameters.

Introducing different roughening profiles into the surface during the roughening allows the coating or spraying process during the later thermal coating to be carried out with substantially constant spraying parameters. The different properties of the coating, such as hardness, porosity, oxidation, machinability, chemical composition and adhesion, are then obtained just on the basis of the differently roughened surface.

It has surprisingly been found that, depending on the chosen roughening profile, the properties of the coating, in particular also the porosity, change. If a first roughening profile is changed such that small elevations, for example peaks, and/or deformations are produced in a second roughening profile, the sprayed layer or coating builds up differently on the two roughening profiles. The peaks and/or deformations have the effect of specifically introducing points at which, for example, oxides preferentially grow. This leads to a higher layer porosity, and consequently greater oil retaining volumes, at the locations where the roughening profile with the peaks or deformations occur in the cylinder running surface. At the same time, the roughening profiles do not have to be completely different; the macrostructure of the roughening profiles may remain the same, it is just that the roughening profile is impressed with a further microstructure with peaks or deformations that changes the layer buildup in comparison with the layer buildup of the unchanged roughening profile.

Specifically changing the roughening structure in the corresponding regions along the cylinder allows the layer buildup, and consequently the porosity, to be influenced under the same spraying parameters. In other words, different porosities, and consequently oil retaining volumes, can be produced at the desired locations without rearranging or changing the coating process during the coating of a cylinder.

With preference, a roughening profile comprises a basic profile. This basic profile or the macrostructure may be the same for the entire surface, in particular of the cylinder running surface, in that for example a constant turned groove is introduced into the surface area. The different roughening profiles are then obtained by way of the microstructure, for example by specifically introducing additional deformations into the basic profile. A surface may also have different basic profiles, in that for example the form, height, width and/or spacing of the basic profile is changed, so that, seen over the cylinder running surface, different basic profiles are used.

The basic profile is advantageously configured as a dovetail profile, rectangular profile, trapezoidal profile or sawtooth profile. Such profiles may be used directly for the coating, but can also easily be changed, in order to produce the stated microstructures. The form of the basic profile is not restricted to these profiles, but rather it is possible to produce any other kind of basic profile that provide the required undercuts in the surface already in the basic profile and/or by further machining. The basic profile may be created by various processes, for example by milling, turning, lasering, etc.

With preference, a roughening profile is produced by one or more subprofiles being introduced into or applied to a basic profile. This may be carried out either already in the first working step, that is to say when the basic profile is produced, in that for example a turning tool with a slightly different cutting edge is used. Or it may be introduced separately, in that, at the same time as the basic profile is produced or in a second working step, a tool that subsequently forms the subprofiles from the basic profile is used in the region of said roughening profile. This tool may be a roller, with which the basic profile is subsequently deformed. Or it may take place by means of one or more small blades which are in engagement with the basic profile in the region of the roughening profile and correspondingly cut out the subprofiles from the basic profile.

In an advantageous configuration, a subprofile is formed as a sawtooth profile. Then, one or more sawtooth profiles are formed into the basic profile. This on the one hand allows the production of undercuts, which are good for the adhesion of the coating. On the other hand, the peaks that are responsible for oxide formation on the sprayed layer, and consequently bring about a more porous coating, are produced.

With preference, a roughening profile is produced by a basic profile and/or a subprofile being further shaped, at least in certain portions, by plastic deformation or removal. This may take place by means of knurling, laser ablation, hammer brushing, high-pressure water jetting, sand blasting or similar processes. For example, a basic profile may be pitted by means of a pulsed laser beam, whereby a different roughening profile than the basic profile is produced.

With preference, the method is used in the case of a cylinder block of an internal combustion engine, the surface being a cylinder running surface. The easy introduction of different roughening profiles into a surface before the coating allows the differently required porosity to be produced in a simple way in the finished, coated cylinder running surface.

In a preferred configuration, a roughening profile in the region of the top and/or bottom dead center of a piston sliding in the cylinder running surface consists of a basic profile with one or more applied subprofiles. This measure achieves the effect in a simple way that the porosity of the cylinder running surface is higher at the top and bottom dead centers than in the region in between. Easy machining of the basic profile that is present all over the surface in the region of the top and bottom dead centers by introducing or applying the subprofiles to the basic profile has the effect that the coating has the higher porosity in these regions.

In a further advantageous configuration, a roughening profile in the region of the top and/or bottom dead center of a piston sliding in the cylinder running surface consists of a basic profile or a basic profile with one or more applied subprofiles, the basic profile and/or at least one subprofile being further shaped, at least in certain portions, by plastic deformation or removal. In principle, the same idea as in the previous paragraph is applied, but here a plastic deformation or machining of the basic profile and/or of a subprofile applied thereto takes place, for example by knurling, hammer brushing, laser machining, etc.

With preference, a roughening profile in the region between the top and bottom dead centers of a piston sliding in the cylinder running surface consists of a basic profile. In the region between the dead centers, the basic profile that is present in any case is not machined any further. On account of the relatively more compact form of the basic profile with few branchings, the sprayed layer solidifies with less oxide formation during the application of the thermal coating, whereby the porosity in this region is less than in the regions as described in the two previous paragraphs.

This division into basic profiles and subprofiles or deformed basic profiles allows the desired differing porosity to be produced in a simple way on a cylinder running surface. During the application of the thermal coating, the spraying parameters can be left substantially unchanged; the different properties on the coating are obtained substantially on the basis of the different roughening profiles.

Further advantages and configurations of the invention are obtained from the figures, in which:

BRIEF DESCRIPTION OF THE DRAWINGS

FIG. 1 shows a section through a cylinder running surface after the roughening;

FIGS. 2a-d show enlarged sections of the details A-D from FIG. 1;

FIG. 3 show a section through a cylinder running surface after coating; and

FIGS. 4a-d show enlarged sections of the details A-D from FIG. 3.

DETAILED DESCRIPTION OF THE PREFERRED EMBODIMENTS

FIG. 1 shows a section through a cylinder running surface 1 of a cylinder block 2 after roughening, the cylinder running surface 1 being the inner surface of a cylinder bore 3. The cylinder running surface 1 has a region of the top dead center 4 and a region of the bottom dead center 5, the region of a dead center being the region on the cylinder running surface 1 which, in the upper and lower end positions of a piston—not represented here—where the piston briefly reaches the speed zero, is entirely or at least partially covered by the piston. The enlarged sections from the cylinder block web 2a of details A-D are represented in FIGS. 2a-d.

FIG. 2a shows the enlarged detail A from a region between the region of the top dead center 4 and the region of the bottom dead center 5. The roughened cylinder running surface 1 has as a roughening profile the trapezoidal basic profile 6. This can be produced from the material of the cylinder block 2 in a simple turning, milling or drilling operation.

FIG. 2b shows the enlarged detail B from the region of the bottom dead center 5. The roughened cylinder running surface 1 has as a roughening profile the trapezoidal basic profile 6, the basic profile 6 additionally having the two sawtooth-shaped subprofiles 7. The two subprofiles 7 can be formed from the basic profile 6 for example by a rolling operation.

FIG. 2c shows the enlarged detail C from the lower region of the top dead center 4. The roughened cylinder running surface 1 has as a roughening profile the trapezoidal basic profile 6, which additionally has the finely divided sawtooth profile 8 as a subprofile, the sawtooth profile 8 having been introduced on the top flank of the basic profile 6. The sawtooth profile 8 can be produced by being introduced into the smooth cylinder inner wall by means of fine turning before the basic profile 6 is produced. After production of the basic profile 6, it remains on the top flank of the basic profile 6.

Finally, FIG. 2d shows the enlarged detail D from the upper region of the top dead center 4, that is to say where the greatest loads occur in an internal combustion engine. The roughened cylinder running surface 1 likewise has as a roughening profile the trapezoidal basic profile 6, which here additionally has the two sawtooth-shaped subprofiles 7 from FIG. 2b and the finely divided sawtooth profile 8 as a further subprofile, as described in FIG. 2c. By using the two different subprofiles 7, 8, the roughening profile has in this region a relatively much larger surface than the roughening profile from FIG. 2a, consisting only of the basic profile 6.

FIG. 3 shows the same section through the cylinder running surface 1 of the cylinder block 2 as in FIG. 1, but after the coating of the cylinder running surface 1 with the coating 9 applied by a thermal spraying process.

The enlarged sections from the cylinder block web 2a of details A-D are represented in FIGS. 4a-d, analogously to the representation in FIGS. 2a-d. On account of the thermal application of the coating 9, in which very hot material is sprayed onto the roughened surface 1, the roughening profiles are partially made to melt at the same time, so that the roughening profiles no longer have the same cross-sectional form after application of the coating as before application, i.e. as after the roughening process. For this reason, where reference is made in the following description to the form of the roughening profiles, the initial form of the roughening profiles in FIGS. 2a-d should always be taken as a basis.

FIG. 4a again shows the enlarged detail A from a region between the region of the top dead center 4 and the region of the bottom dead center 5, this time with coating 9. The smooth form of the basic profile 6 has the effect that the coating 9 is produced during the thermal spraying without any great oxide formation and pore formation. The pores 10 are correspondingly small; the coating 9 has a low porosity. Since the piston speed is high in this region, the low porosity has a positive effect on the oil consumption.

In the enlarged detail B in FIG. 4b from the region of the bottom dead center 5, the coating 9 shows coarser or larger pores 10 than in FIG. 4a. The reason for this is the two subprofiles 7 (see FIG. 2b), which act during the thermal spraying as a trigger for layer formation, melt away on account of the heat of the sprayed material and thus lead to quicker solidification of the sprayed-on material, with accelerated formation of oxides and pores in the coating 9.

The situation in FIG. 4c is similar to that in FIG. 4b, where the enlarged detail C from the lower region of the top dead center 4 is shown. The finely divided sawtooth profile 8 (see FIG. 2c) acts again as a trigger for the oxide formation and pore formation in the coating 9. The pores are slightly finer or smaller than in FIG. 4b, but coarser than in FIG. 4a.

In FIG. 4d, where the enlarged detail D from the upper region of the top dead center 4 is represented, the very coarse and large pores that are produced on account of the relatively much larger surface of the roughening profile in this region during the application of the coating 9 can be clearly seen. This allows the region of the top dead center 4 to be provided with a very porous coating 9, which in an ideal way still maintains a lubrication of a piston even when the speed of the piston is very small and the combustion pressure is very high.

The invention claimed is:

1. A method for roughening and thermally coating a cylinder running surface of an internal combustion engine comprising:
    roughening the surface to introduce different roughening profiles into the surface; and
    applying a thermal coating to the surface, wherein the different roughening profiles cause the coating to have different oxidation properties distributed over the surface.

2. The method as claimed in claim 1, wherein the coating also varies over the surface in at least one property of the group comprising hardness, porosity, machinability, chemical composition and adhesion of the coating.

3. The method as claimed in claim 1, wherein at least one of the roughening profiles comprises a basic profile.

4. The method as claimed in claim 3, wherein the basic profile is configured as a dovetail profile, rectangular profile, trapezoidal profile or sawtooth profile.

5. The method as claimed in claim 3, wherein at least one of the roughening profiles is produced by one or more subprofiles being introduced into or applied to the basic profile.

6. The method as claimed in claim 5, wherein at least one of the subprofiles is formed as a sawtooth profile.

7. The method as claimed in claim 3, wherein at least one of the roughening profiles is produced by the basic profile and/or a subprofile being further shaped, at least in certain portions, by plastic deformation or removal.

8. A method for roughening and thermally coating a surface, comprising:
    roughening the surface to introduce different roughening profiles into the surface; and
    applying a thermal coating to the surface under substantially constant spraying parameters, wherein the coating has a variable porosity over the surface due to the different roughening profiles.

9. The method as claimed in claim 8, wherein the surface comprises a cylinder running surface.

10. A workpiece comprising:
    a surface roughened with different roughening profiles; and
    a coating applied to the surface during a thermal spraying process, wherein the coating has different porosities distributed over the surface due solely to the different roughening profiles.

11. The workpiece as claimed in claim 10, wherein the surface comprises a cylinder running surface.

12. The workpiece as claimed in claim 11, wherein the roughening profiles comprise one or more basic profiles, and, for the different roughening profiles, at least one of the basic profiles is deformed, in certain regions.

13. The workpiece as claimed in claim 12, wherein one of the roughening profiles or one of the basic profiles is configured as a dovetail profile, rectangular profile, trapezoidal profile or sawtooth profile.

14. The workpiece as claimed in claim 12, wherein one or more subprofiles are applied to one or more of the basic profiles fully or in certain portions.

15. The workpiece as claimed in claim 10, wherein the workpiece is a cylinder block of an internal combustion engine and the surface is a cylinder running surface.

16. The workpiece as claimed in claim 15, wherein at least one of the roughening profiles located in the region of a top and/or bottom dead center of a piston sliding in the cylinder running surface consists of a basic profile with one or more subprofiles.

17. The workpiece as claimed in claim 15, wherein at least one of the roughening profiles in the region of the top and/or bottom dead center of a piston sliding in the cylinder running surface consists of a basic profile or a basic profile with one or more subprofiles, and the basic profile and/or at least one subprofile is further shaped, at least in certain portions, by plastic deformation or removal.

18. The workpiece as claimed in claim 15, wherein the roughening profile in the region between the top and bottom dead centers of a piston sliding in the cylinder running surface consists of a basic profile.

19. The workpiece as claimed in claim 15, wherein the cylinder block comprises a top dead center and a bottom dead center of a piston sliding in the cylinder running surface, wherein the cylinder running surface has a lower porosity in a midportion between the top and bottom centers as compared to porosity at the top and bottom centers.

* * * * *